US006320163B2

(12) United States Patent
Bergeron et al.

(10) Patent No.: US 6,320,163 B2
(45) Date of Patent: *Nov. 20, 2001

(54) APPARATUS AND METHOD FOR NON-DESTRUCTIVE, LOW STRESS REMOVAL OF SOLDERED ELECTRONIC COMPONENTS

(75) Inventors: Christian Bergeron, St. Alphonse de Granby; Raymond Lord, Bromont; Mario Racicot, Granby, all of (CA)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/736,589

(22) Filed: Dec. 13, 2000

Related U.S. Application Data

(62) Division of application No. 09/460,279, filed on Dec. 13, 1999, now Pat. No. 6,163,014.

(30) Foreign Application Priority Data

Jan. 18, 1999 (CA) .................................................. 2259043

(51) Int. Cl.$^7$ ............................. B23K 3/00; B23K 31/02; B23K 1/018; F27B 9/00; F27B 9/36
(52) U.S. Cl. .......................... 219/388; 219/392; 219/393; 228/119; 228/264
(58) Field of Search ..................................... 219/388, 385, 219/392, 393, 409; 228/119, 191, 264

(56) References Cited

U.S. PATENT DOCUMENTS

| | | |
|---|---|---|
| 5,237,269 * | 8/1993 | Aimi et al. ........................ 324/158.1 |
| 5,556,024 | 9/1996 | Olson et al. . |
| 5,636,781 * | 6/1997 | Olson et al. ............................. 228/19 |
| 5,707,000 * | 1/1998 | Olson et al. .......................... 228/264 |
| 5,715,592 * | 2/1998 | Mori et al. ............................ 228/191 |
| 5,722,579 * | 3/1998 | Yu et al. ............................... 228/264 |
| 5,738,267 * | 4/1998 | Olson et al. ............................. 228/19 |
| 5,779,133 * | 7/1998 | Jackson et al. ....................... 228/264 |
| 5,961,026 * | 10/1999 | Olson et al. ............................. 228/19 |
| 6,029,730 * | 2/2000 | Gospe et al. ......................... 156/584 |

FOREIGN PATENT DOCUMENTS

19808728 * 9/1998 (DE) .
305696 * 3/1989 (EP) .

* cited by examiner

*Primary Examiner*—Joseph Pelham
(74) *Attorney, Agent, or Firm*—Lawrence R. Fraley

(57) ABSTRACT

Circuit chips, such as known good die (KGD) chips, are removed from an assembly including a plurality of circuit chips attached to at least one chip carrier, or substrate. The substrate is held within a top plate with the circuit chips positioned within successive chip cavities within a bottom plate. Each chip cavity includes a load surface separated by a cascade effect pitch with respect to adjacent chip cavities. A cascade effect shear force is sequentially applied to the circuit chips to remove them from the substrate. The chips may be heated to a temperature facilitating shear within a temperature range at which solder connections are solid, and the chips further heated following disassembly to a temperature at which the solder is liquid to facilitate reforming the solder for subsequent attachment of the chip into an electronic device.

4 Claims, 6 Drawing Sheets

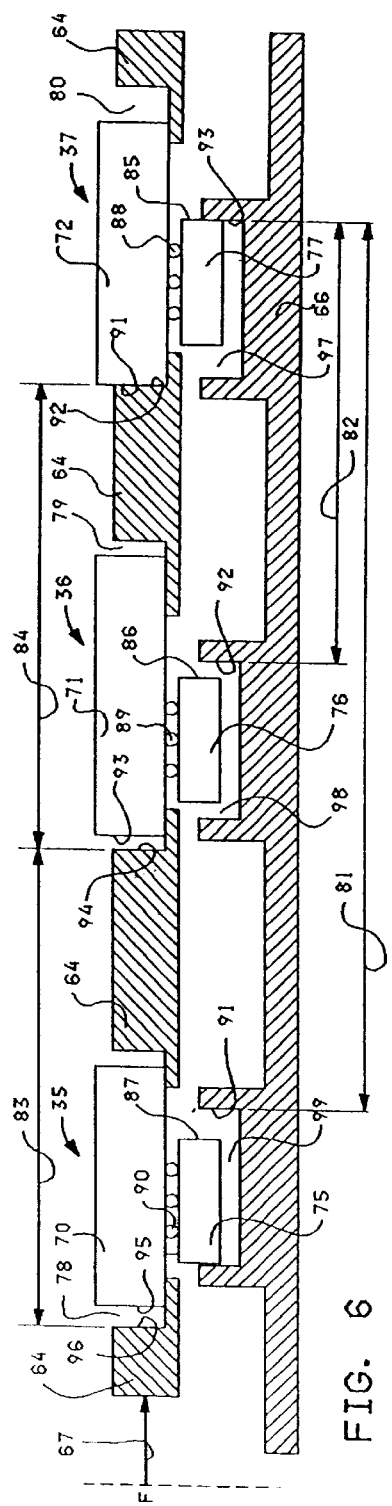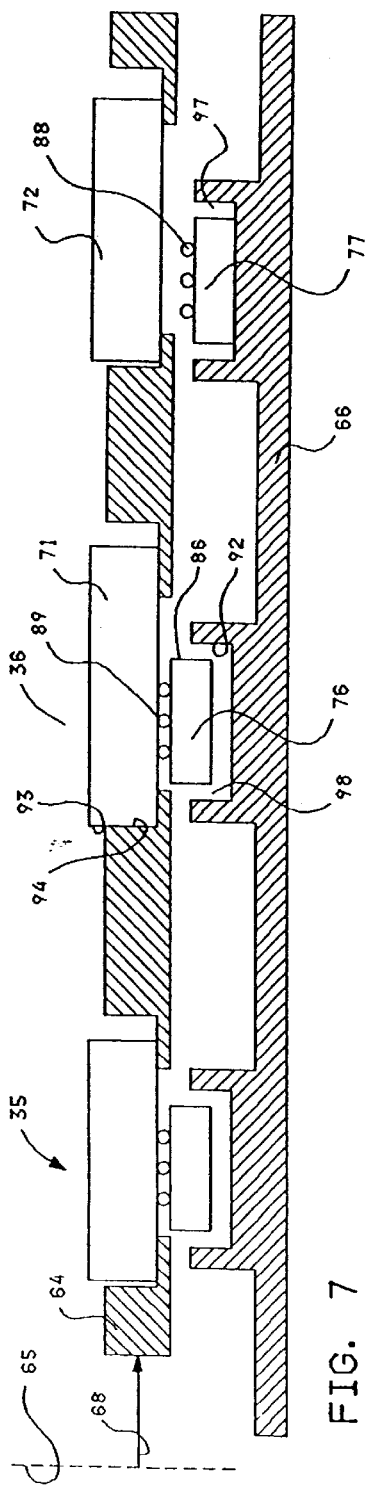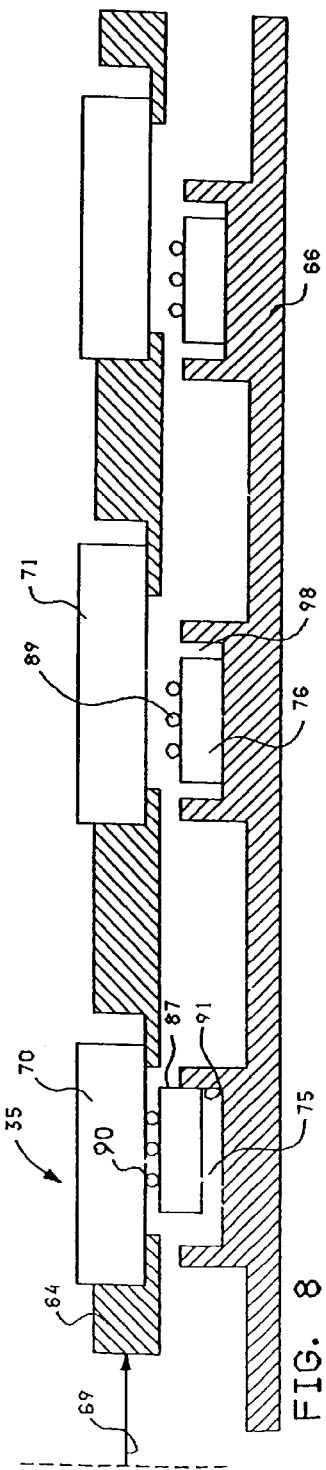

APPARATUS AND METHOD FOR NON-DESTRUCTIVE, LOW STRESS REMOVAL OF SOLDERED ELECTRONIC COMPONENTS

This application is a divisional application of Ser. No. 09/460,279, filed Dec. 13, 1999, now U.S. pat. No. 6,163, 014.

BACKGROUND OF THE INVENTION

Technical Field of the Invention

This invention pertains to an apparatus and method for removing soldered electronic components from a substrate. More particularly, it relates to non-destructive, low stress removal of chips temporarily soldered to a substrate during Known-Good-Die (KGD) process of flip chip devices.

CROSS REFERENCE TO COPENDING APPLICATION

Ser. No. 09/704,033, filed Nov. 1, 2000, defines apparatus and methods for sequentially removing semiconductor chips from a substrate.

BACKGROUND ART

As technology has evolved, semiconductor devices have become smaller and more dense, which has resulted in corresponding increases in overall failure rates, which in turn results in uncompetitive situations for chip manufacturers. In order to readily identify and eliminate the use of defective chips before the defective chips are finally mounted in a product, burn-in processes have evolved. During the burn-in process, normally a chip carrier is provided for testing the chips. The chip carrier has electrical contacts which correspond to the electrical contacts on the semiconductor chip. It is desirable for the carrier contacts to be mechanically weak but strong enough for holding the semiconductor chip in place and to maintain good electrical connections during testing. The chip is normally positioned on the chip carrier so that the electrical contacts, e.g., solder balls, on the chip are aligned with the corresponding contacts on the carrier and then the solder balls make electrical connections between the chip and the carrier.

In one process for the manufacture of KGD flip chip devices, silicon chips are temporarily attached by solder balls (typically a SnPb alloy, such as 3% tin (Sn) and 97% lead (Pb), referred to as 3/97 solder) to a composite or ceramic substrate, or chip carrier, and subjected to electronic component testing and burn-in. Following this testing, the chips are mounted in a first fixture and subjected at ambient temperature to shear forces across the solder balls to remove the chip from the substrate. These forces typically fracture the solder balls, leaving some solder attached to the substrate and some to the chip. Thereafter, the chips are removed from the first fixture, and those which tested as good mounted in a second fixture for heat processing to liquify the solder on the chip and reform the solder balls. The resulting chips are then packaged and eventually mounted in an array of chips on another substrate.

A variety of processes and techniques have been devised and described in the art to form a temporary connection between semiconductor chips and carriers, so as to be able to readily separate the chip and the carrier after burn-in tests have been conducted. Several of these are described in U.S. Pat. No. 5,556,024 by David C. Olson and Robert Phillips, III, and of common assignee, for "Apparatus and Method for Removing Known Good Die Using Hot Shear Process", the teachings of which are incorporated herein by reference. In the improved process which is the subject of the Olson and Phillips patent, the carrier and the device are placed in a fixture, heated to the solder liquidus temperature, and the device pulled away from the substrate. In one embodiment, after being heated to the solder liquidus temperature, shear forces are applied sufficient to overcome solder surface tension and separate the die and carrier. This type of separation occurs within the solder joint such that only part of the solder remains on the chip, thus requiring an additional step of site dressing whereby the required solder volume is restored to the chip pad sites so that the KGD chip can be subsequently permanently assembled into a microelectronic package.

It is an object of the invention to provide an improved method and apparatus for separating chips from chip carriers.

It is a further object of the invention to provide an improved method and apparatus for processing KGD chips, to remove them from the chip carrier while the solder connections are solid, such that substantially all of the solder remains attached to the chip.

It is a further object of the invention to provide an apparatus for removing chips from substrates where the force required is substantially the same for all chips or rows of chips.

It is a further object of the invention to provide a cascade effect apparatus and method for sequentially removing chips or rows of chips from one or more chip carriers, or substrates.

It is a further object of the invention to provide an apparatus comprising a single fixture for removing chips from a chip carrier and reforming the solder on the chips.

SUMMARY OF THE INVENTION

In accordance with the invention, an apparatus and method is provided for removing circuit chips from an assembly including a one or more circuit chips attached to at least one chip carrier, or substrate. The chips are subjected to static shear with respect to the substrate, and heated to a temperature facilitating shear within a temperature range at which solder connections are solid, such that the chip is sheared off with respect to the substrate at the plane of attachment of the solder to the substrate. In accordance with a further aspect of the invention, the chips are further heated following disassembly to a temperature at which the solder is liquid to facilitate reforming the solder for subsequent attachment of the chip into an electronic device.

In accordance with a further aspect of the invention involving the removal of a plurality of circuit chips from one or more substrates, the substrate is held within a top plate with the circuit chips positioned within successive chip cavities within a bottom plate. Each chip cavity includes a load surface separated by a cascade effect pitch with respect to adjacent chip cavities. A cascade effect shear force is sequentially applied to the circuit chips to remove them from the substrate.

Other features and advantages of this invention will become apparent from the following detailed description of the presently preferred embodiment of the invention, taken in conjunction with the accompanying drawings.

BRIEF DESCRIPTION OF THE DRAWINGS

FIGS. 6–8 illustrate a fixture for disassembly of a plurality of KGD chips from a plurality of substrates using the cascade effect.

BEAST MODE FOR CARRYING OUT THE INVENTION

Figure 1:
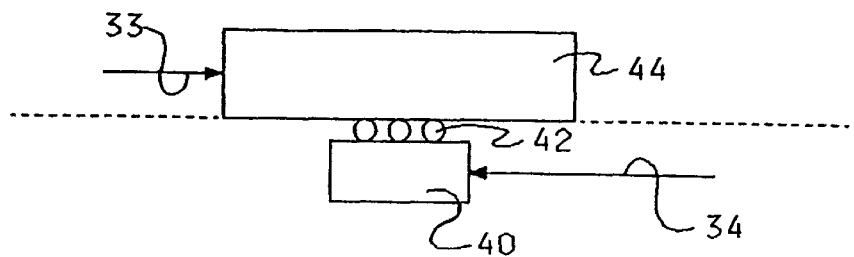
FIG. 1 illustrates a chip mounted on a substrate, and the application of shear forces through connecting solder balls.

In accordance with the process of the present invention, a nondestructive, low stress removal process for soldered electrical components is provided. The process can be used for example to nondestructively separate a chip from the carrier (substrate) to which it is soldered. The process includes applying lateral shear forces (as opposed to pulling forces) to the carrier and chip with the carrier and chip located in an appropriate temperature profile environment such that the chip and carrier are laterally moved with respect to each other when separation of the chip and carrier occurs at a temperature below the liquidus temperature of the solder joining the contacts of the chip and carrier. The solder is still solid and has not melted at the point of separation. This leaves substantially the entire volume of solder material intact on the pads of the chip providing for reflow of the solder into solder bumps for subsequent attachment.

In accordance with the apparatus of the invention, an apparatus is provided for removing a chip from a substrate to which it is soldered. Lateral shearing forces are applied to the chip and substrate as heat is applied to disassemble the chip from the substrate. The chip is positioned on a bottom plate having protrusions forming a chip cavity for holding the chip. A top plate having an opening forming a substrate cavity slides on the bottom plate and supports the substrate. A mechanism is provided, such as a spring or vacuum device or pneumatic ram, to exert a shearing force on the substrate while the chip is held on the bottom plate by the protrusions as the temperature is raised. When the temperature is still below the temperature required to liquefy the solder, the solder connections between the contacts of the chip and the substrate are fractured resulting in the separation of the chip and substrate at the substrate/solder surface, leaving substantially all of the solder affixed to the chip.

When using a single cavity carrier/chip assembly apparatus, the assembly's temperature is homogeneous and the force per assembly is known and sufficient to disassemble the components in the solidus state.

However, when implementing the method of the invention with a multiple cavity carrier/chip assembly apparatus, the following conditions must be accommodated. First, since components (carrier, chip, cavity, etc.) have inherent dimensional variability, an undetermined quantity of assemblies are subjected to the shear force in each run. For example, when using a 96 cavity apparatus, the first run could have 50 assemblies under load. A second run could have only 25 assemblies under load. Consequently, the force per assembly is unknown and will most probably be insufficient to disassemble the solder in the solidus state from the substrate. Second, a matrix of cavity rows and columns increases the apparatus' size and weight (vs the single cavity). Hence, a non-negligible temperature gradient exists between the assemblies. For example, in a typical batch oven process, the peripheral assemblies are warmer than the center assemblies. In a typical continuous belt furnace, the leading assemblies (first row) are warmer than the trailing assemblies (last row). In one case, some assemblies could be under load but have insufficient temperature for disassembly in the solidus state. In another case, some assemblies could be at the appropriate temperature range but not be under load, or sufficient load.

In accordance with a preferred embodiment of the apparatus of the invention, these conditions are accommodated by use of a cascade effect fixture in a continuous belt furnace. As previously noted, in a continuous belt furnace, the chip assembly in the leading or first row is warmer than the assembly in the second row, which assembly is warmer than the assembly in the third row, and so on. The assemblies in the first row will be the first to attain the appropriate temperature range for disassembly. Hence, in accordance with the preferred embodiment of the invention, upon reaching the appropriate temperature range, these first row assemblies are the first and only ones subjected to the shear force and disassembly. Once that first row is disassembled, the shear force is applied to the assemblies in the second row as they attain the appropriate temperature range for disassembly. Once the second row is disassembled, the shear force is applied to the assemblies in the third row, and so on to the last row. This is referred to as the cascade effect, and is achieved in accordance with the preferred embodiment of the invention through the use of a fixture in which a top plate provides a series of carrier/substrate cavities of known (and, in a preferred embodiment, constant) pitch row to row, and in which a bottom plate provides a series of chip cavities of variable pitch, where the pitch between the first chip cavity and second chip cavity is equal to the carrier/substrate cavity pitch minus a delta, the pitch between the first chip cavity and the third chip cavity is equal to two times the carrier/substrate cavity pitch minus two times delta, and so on. In this way, only the assemblies from the first row will initially be subjected to the shear force, and the remaining assemblies will not be loaded. Once the assemblies from the first row are disassembled, only the assemblies from the second row will be loaded and the remaining assemblies (including those of the first row) will be unloaded. Again, this is the essence of the cascade effect. In yet another embodiment, the deltas may be applied in such a matter as to achieve the cascade effect with some small plurality of rows of chips being under load at each stage.

Referring now to FIG. 1, a typical assembly includes a ceramic or composite substrate 44 to which a die, or silicon chip 40, is attached by solder balls 42. Solder balls 42 may comprise a SnPb alloy, such as 3/97 solder (3% Sn and 97% Pb). However, other chip and chip carrier materials, and solder alloys, may be employed by appropriately adjusting the shear forces and temperatures so as to achieve disassembly in the solder solidus state with fracture at the plane of the solder ball 42 connection to the chip carrier 44, thereby leaving the substantially the entire solder ball 42 on chip 40. Shear stresses are created in solder balls 42 while in the solidus state to achieve separation or disassembly in plane 32 at the chip carrier/solder ball connection by raising the temperature above ambient and loading carrier 44 with a force 33 and die 40 with a force 34, as will be explained hereafter.

Figure 2:
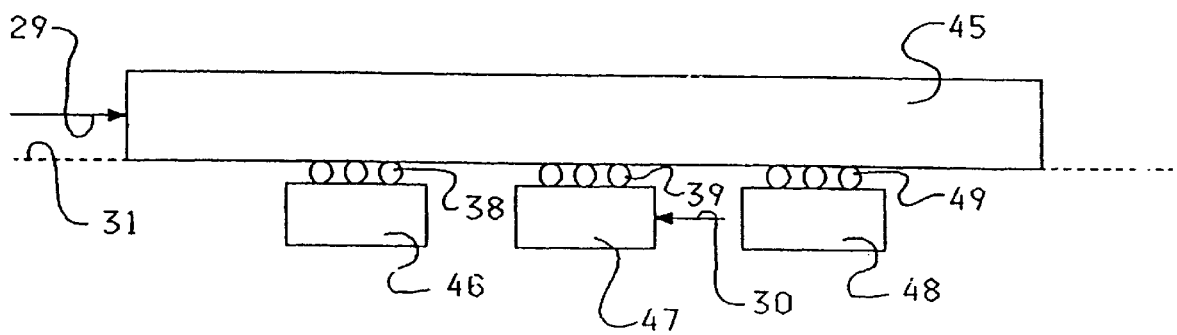
FIG. 2 illustrates a plurality of chips mounted on a substrate.
Figure 3:
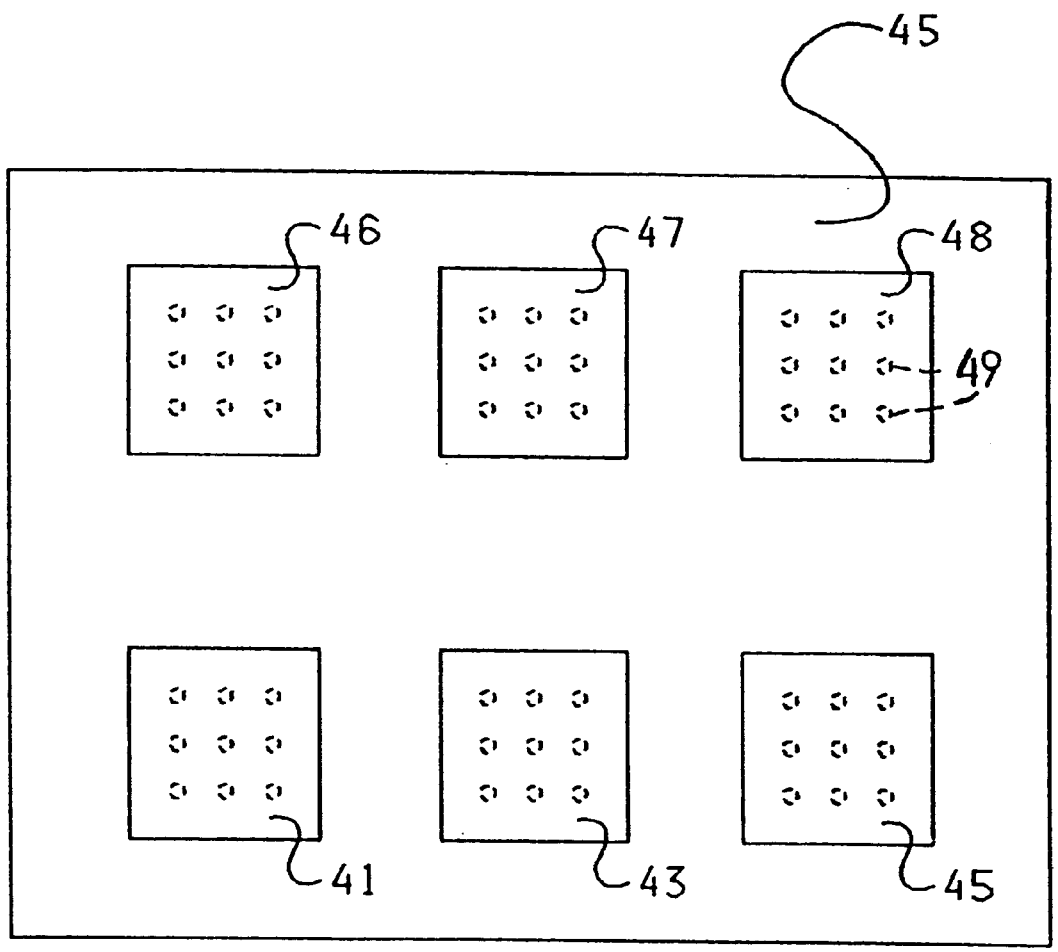
FIG. 3 illustrates another view of a plurality of chips mounted on a substrate.

Referring to FIG. 2, a plurality of die 46–48 are attached by solder balls 38, 39, 49 to a common substrate 45. Referring to FIG. 3, substrate 45 may carry a matrix of die 41, 43, 45, 46, 47, 48, as illustrated. Disassembly shear stress is introduced into solder balls 39 by loading substrate 45 with force 29 and chip 47 with force 30. Upon reaching the appropriate temperature/shear profile, and with the adhesive forces between the solder balls 39 and chip carrier 45 being less than that between the solder balls and die 47, disassembly occurs in solder balls 39 at plane 31.

Figure 4:
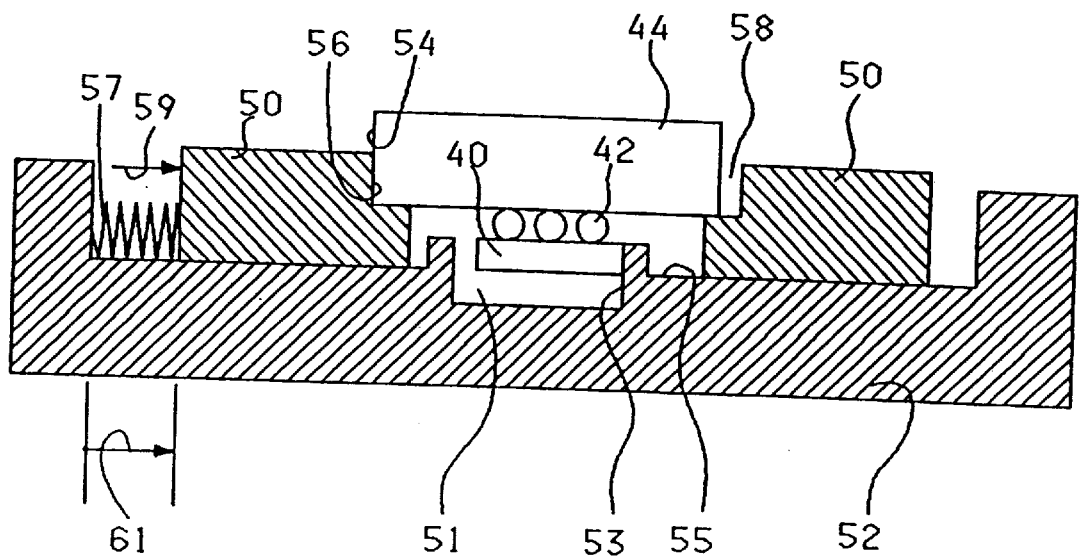
FIGS. 4 and 5 illustrate a fixture for disassembly of a KGD chip from a substrate by application of shear stresses to solder balls in the solidus state.
Figure 5:
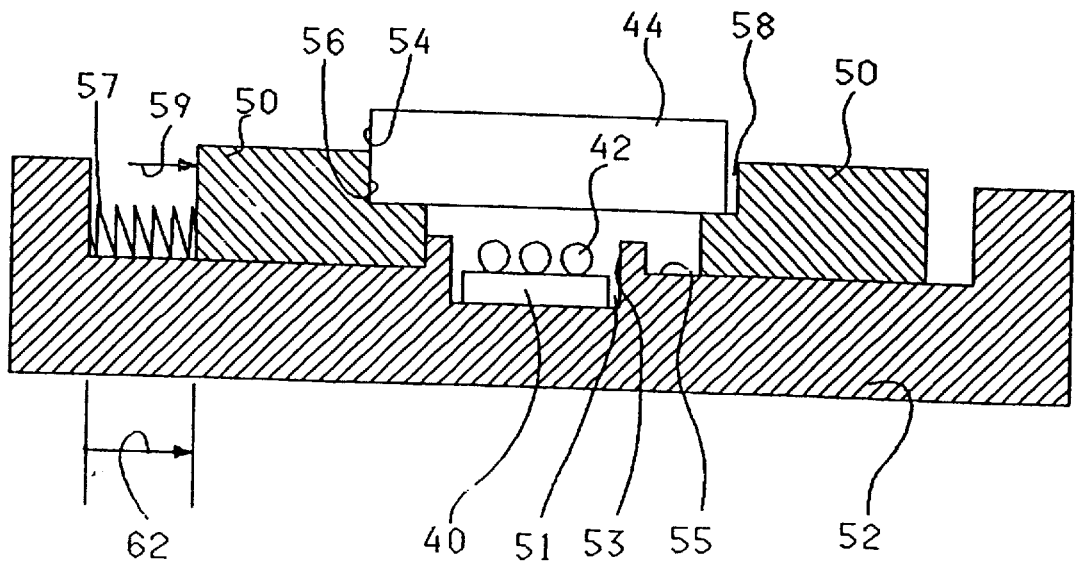

Referring to FIGS. 4 and 5, a fixture is illustrated for holding die assembly 40,42, 44 during disassembly. The fixture includes a top plate 50 and a bottom plate 52. Top plate 50 is slidably mounted on surface 55 of bottom plate 52, and urged in the direction of arrow 59 by the force applied by spring 57. Top plate 50 includes a carrier cavity 58 in top plate 50 into which the chip/carrier assembly is positioned with the chip extending into chip cavity 51 in bottom plate 52. When under load, load surface 56 of top plate 50 is forced against edge surface 54 of substrate 44 which forces chip 40 against load surface 53 of bottom plate 52. When so loaded, the opposing surfaces 53 and 56 set up a shear load through solder balls 42. Inasmuch as the force of adhesion between solder balls 42 and chip 40 is greater than the force of adhesion between solder balls 42 and carrier 44, when the achieved temperature and force applied by load 57 are appropriate, disassembly occurs, top plate moves from position 61 to position 62, and chip 40 falls by gravity into chip cavity 51.

Referring to FIGS. 6–8, a fixture is provided for disassembling a plurality of chip assemblies 35–37 using the cascade effect. The fixture of this embodiment of the invention includes top plate 64 with a plurality of chip carrier cavities 78–80, and a bottom plate 66 with a plurality of chip cavities 97–98. Chip carrier 70 is positioned in chip carrier cavity 78 with chip 75 extending into chip cavity 99. Bottom plate 66 is fixed (or, alternatively, fixed with respect to the transfer belt which carries the fixture through the oven), and top plate may be slidably mounted or attached to bottom plate 66 such that relative motion is possible in the direction of load 67 as assemblies 35–37 disassemble. Load 67 is a cascade effect load, in that the load is sequentially applied to chip assemblies one chip or one row of chips at a time.

Essential to achieving the cascade effect is the relationship between the substrate cavity pitch and the chip cavity pitch. As represented in FIG. 6, these pitches represent the distances between loading surfaces. Thus, the substrate cavity pitch shown as dimensions 83 and 84, or the distances between loading surfaces 96 and 94, and 94 and 91, respectively. These are equal, as shown. The chip cavity pitch is represented by dimensions 81 and 82, the distances between loading surfaces 91 and 93, and 92 and 93, respectively. In order to achieve the cascade effect, pitch 82 equals the substrate cavity pitch 84 less a small delta; and pitch 81 equals the substrate cavity pitch 83 plus substrate cavity pitch 84 less two (2) times delta. And so on. (While the substrate cavity pitches 83, 84 are shown as equal, in the general case this is not required, provided the chip cavity pitches are adjusted by amounts equal to the inequalities in the substrate cavity pitch.)

As illustrated in FIGS. 6–8, bottom plate 66 remains stationary with respect to reference plane 65 (which plane may be moving with a transport belt through an oven), while top plate 64 moves as shown to the right by an amount equal to delta as each assembly 35–37 disassembles (chips 77, 76 and 75 fall into chip cavities 97, 98, 99, in sequential order).

As represented in FIG. 6, chip 77 side surface 85 is initially loaded against bottom plate loading surface 93 by force 67 against top plate 64, which force is transmitted to loading surface 92 to load substrate side surface 91, which in turn loads die 77 through solder balls 88. This loading sets up shear stresses in solder balls 88, which will fracture at the solder ball/chip carrier connection when the appropriate temperature is achieved. Thereupon, chip 77 falls (by gravity) into chip cavity 97, force 68 moves the upper plate 64 to the position shown in FIG. 7, and loads chip carrier 71 surface 93 against top plate loading surface 94 to bring surface 86 of chip 76 into contact with loading surface 92 and set up shear stresses in solder balls 89. When assembly 86 reaches the appropriate temperature, fracture occurs at the solder ball/chip carrier connection plane, and chip 76 falls into chip cavity 98. Thereupon, top plate 64 is moved by force 69 to the position shown in FIG. 8, to load chip 75 surface 87 against bottom plate loading surface 91 and set up shear stresses in solder balls 90. In this manner, assemblies 37, 36 and 35 are subjected to the cascade effect, and the disassembly forces are substantially constant for each assembly 35–37 in sequential order.

As solder balls 88 separate from substrate 72 due to the shear forces in balls 88 from the loading of substrate surface 91 against top plate loading surface 92 and chip surface 85 against bottom plate loading surface 93 due to the force 67 against top plate 64, chip 77 falls into bottom plate chip cavity 97, top plate 64 moves from position 67 to that of 68, which transfers load 67 (now load 68) to top plate surface 94 against chip carrier surface 93 and chip surface 86 against bottom plate load surface 92.

Figure 9:
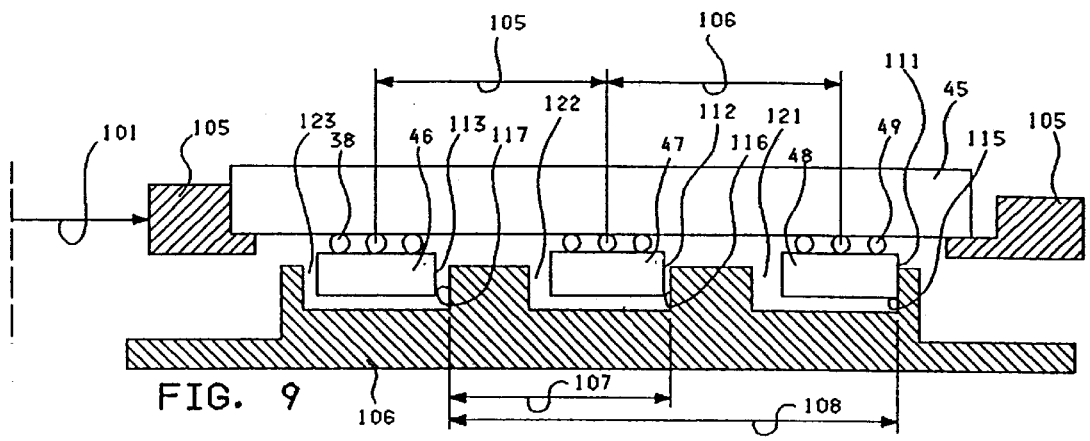
FIGS. 9–11 illustrate a fixture for disassembly of a plurality of KGD chips from a single substrate using the cascade effect.
Figure 10:
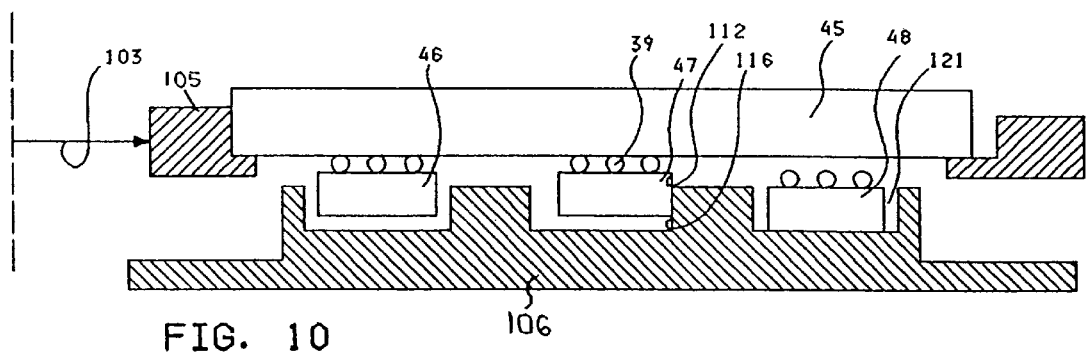
Figure 11:
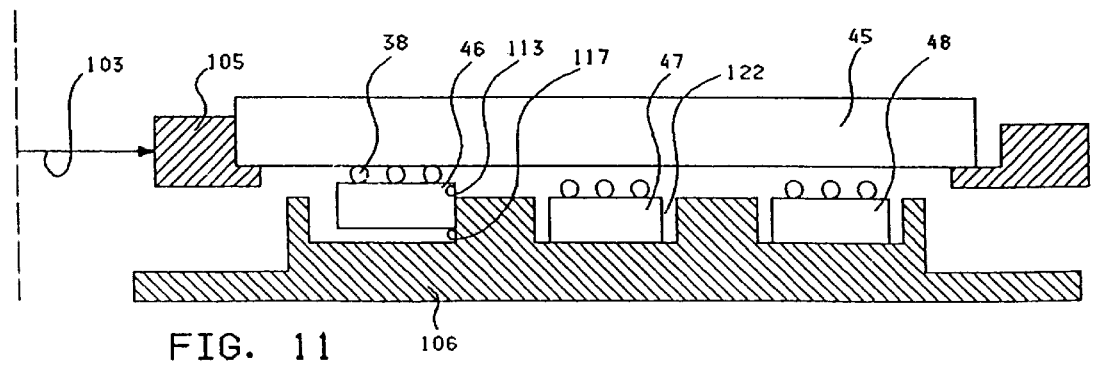

Referring to FIGS. 9–11, a fixture which accomplishes the cascade effect is illustrated for disassembling chips 48, 47, 46 in sequential order from substrate 45. Top plate 105 holds substrate 45 with solder attached chips 46–48 extending into chip cavities 123, 122, 121, respectively, in bottom plate 106. Bottom plate 106 is held stationary with respect to reference plane 120, while top plate 105 is moved by loading force 101, 102, 103 to the right (as shown in FIGS. 9–11) by the amount delta as each chip 48, 47, 46 is disassembled and falls in sequential order into chip cavities 121–123.

In order to achieve the cascade effect, dimension 108 between bottom plate chip loading surfaces 115 and 116 is equal to the chip pitch 106 less a small amount delta; and the distance 107 between bottom plate chip loading surfaces 115 and 117 is equal to the chip pitch 106 plus chip pitch 105 less two times delta. In this case, chip pitches 105 and 106 are shown as equal, but in the general case do not need to be equal. Thus, a cascade effect pitch is a pitch between adjacent chip loading surfaces which is equal to the distance between the adjacent chips, less a delta times a value which is a function of the number of chips from the first chip in the disassembly fixture to the first of the adjacent chips.

Initially, chip 48 surface 111 is loaded by force 101 against chip loading surface 115, setting up shear stresses in solder balls 49. Upon disassembly at the plane of contact between solder balls 49 and substrate 45, chip 48 falls into chip cavity 121, and force 102 moves substrate 45 to the position shown in FIG. 10, with chip 47 surface 112 loaded against bottom plate loading surface 116. Upon disassembly at the plane of contact between solder balls 39 and substrate 45, chip 47 falls into chip cavity 122, and load 103 moves top plate 105 to the position shown in FIG. 11, to bring surface 113 of chip 46 against bottom plate loading surface 117 to establish shear forces in solder balls 38. And so on.

Figure 12:
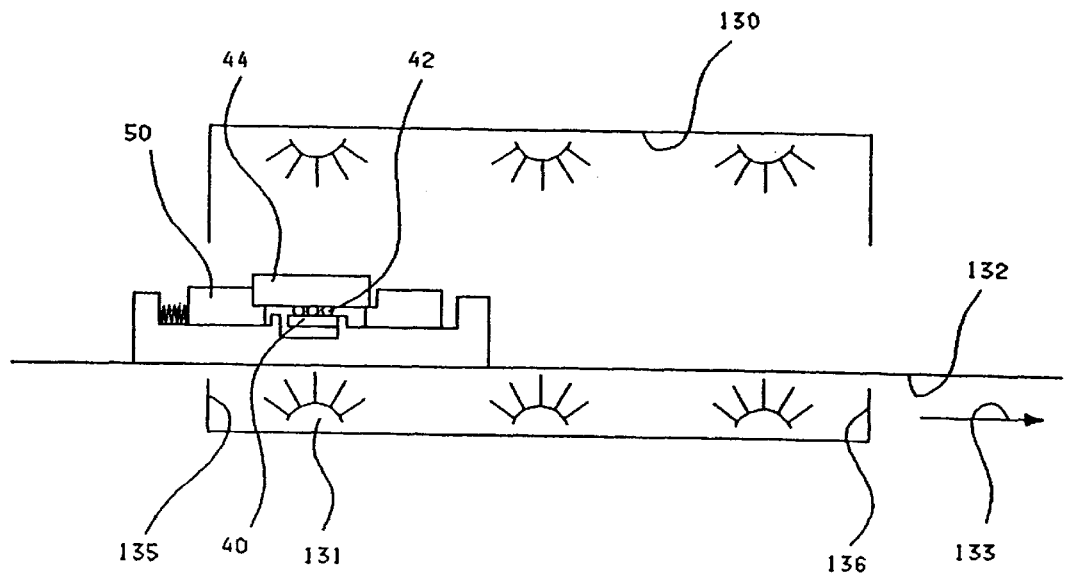
FIG. 12 illustrates an oven for heating a KGD chip to achieve disassembly from a chip carrier.

Referring to FIG. 12, a fixture of the type previously described in connection with FIGS. 4–5 including top plate 50 and bottom plate 52, is carried through oven 130 on belt 132 from front end 135 to back end 136 in the direction of arrow 133. Heat source(s) 131 is provided, and achieves within solder balls 42 connecting die 40 to substrate 44 a temperature profile substantially as shown in FIG. 13.

Thus, in accordance with the preferred embodiment of the invention, a means and method is provided for doing a shear of the solder joint such that substantially all solder remains on the chip. This is accomplished by heating the product (one or more chips soldered on a substrate) to a temperature below the melting point of the solder while applying a static shear force coplanar with the surface of the substrate at the solder connections. This static shear force may be achieved by holding either the substrate or the chip in place while applying the force to the other. Once sheared from the substrate, the chip may be attached to an electronic device without further removal or addition of solder.

In accordance with yet a further preferred embodiment of the invention, a fixture is provided for allowing the removal of multiple chips on a single substrate, or simultaneous removal of multiple chips, each on a separate substrate, in both cases by application of the cascading effect heretofore described. In accordance with yet a further aspect of the invention, the chip may be further heated after removal from the substrate to melt and reform the solder.

Figure 13:
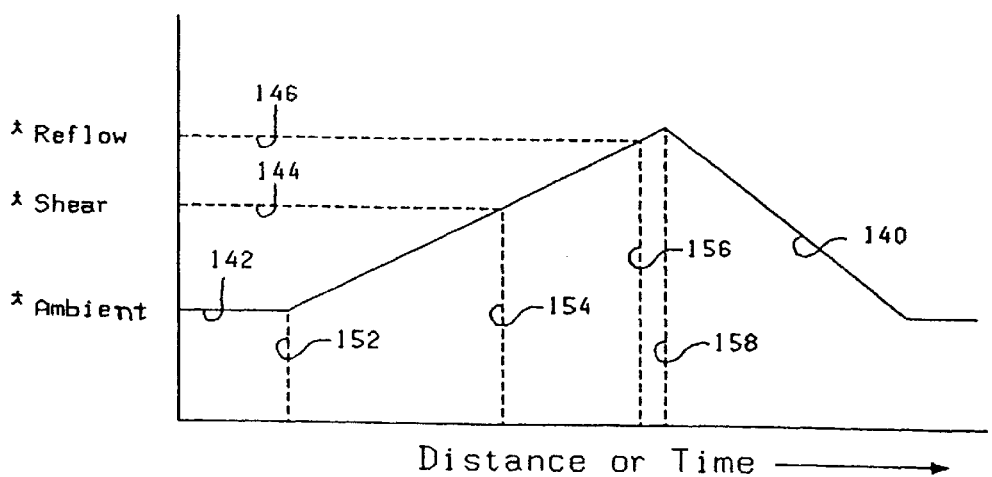
FIG. 13 illustrates the temperature profile achieved in the solder balls connecting a die to a substrate during shear and reflow.

Referring to FIG. 13, the temperature 140 achieved at the plane of connection between solder balls 42 and substrate 44 rises as a function of time (which is also, in this specific embodiment, a function of distance traveled through oven 130) from ambient 142 at time 152 at the entry 135 to the oven, to the temperature (in the solidus state) 144 at time 154 at which the shear forces applied achieve separation, and then on up to the temperature 146 at time 156 at which the solder reflows to reform the solder on chip 40 for subsequent assembly. At time 158, the fixture passes back end 136, and temperature returns to ambient. Thus, a single operation, requiring only one loading of a fixture, accomplishes both disassembly and solder reflow.

While reference has been made to solder balls, such as the 3/97 alloy, it will be apparent to those skilled in the art that other solder connections, such as controlled collapse component connectors (C4) or solder columns, may be employed.

Advantages over the Prior Art

It is an advantage of the invention that there is provided an improved method and apparatus for separating chips from chip carriers.

It is an advantage of the invention that there is provided an improved method and apparatus for processing KGD chips, to remove them from the chip carrier while the solder connections are solid, such that substantially all of the solder remains attached to the chip.

It is an advantage of the invention that there is provided an apparatus for removing chips from substrates where the force required is substantially the same for all chips or rows of chips.

It is an advantage of the invention that there is provided a cascade effect apparatus and method for sequentially removing chips or rows of chips from one or more chip carriers, or substrates.

It is an advantage of the invention that there is provided an apparatus comprising a single fixture for removing chips from a chip carrier and reforming solder on the chips for subsequent attachment.

Alternative Embodiments

It will be appreciated that, although specific embodiments of the invention have been described herein for purposes of illustration, various modifications may be made without departing from the spirit and scope of the invention.

Accordingly, the scope of protection of this invention is limited only by the following claims and their equivalents.

What is claimed is:

1. An apparatus for removing circuit chips from an assembly including a plurality of chips each attached to a respective substrate by solder material, comprising:

a fixture for holding each of said substrates having one of said chips thereon wherein said chips are soldered to a bottom surface of said substrates and thereby face down from said substrates, said fixture adapted for holding said substrate and chips while a static shear force is applied to each of said chips;

a furnace for applying heat to each of said substrates having said chips thereon in a sequential manner;

said static shear force being applied in a sequential manner to said substrates having said chips thereon such that the first heated substrate and chip are separated with said chip falling by gravity, followed by the second heated substrate and chip being separated with said chip also falling by gravity and so forth, said separation of said chips and substrates occurring while said substrates and chips are heated below the melting temperature of said solder attaching said chips to said substrates.

2. The apparatus of claim 1, further comprising a heat source for heating said chips following said application of said static shear force to cause said chip separation sufficient to bring said solder to a liquid state sufficient to reform said solder for subsequent attachment into an electronic device.

3. A method for removing a plurality of circuit chips from an assembly wherein each of said chips is attached to a respective substrate by solder material, said chips having interconnection pads thereon, said method comprising the steps of:

placing said assembly in a fixture such that said chips are soldered to a bottom surface of said respective substrates and thereby face down from said substrates in said fixture;

applying heat to each of said substrates in said fixture in a sequential manner such that the chip on the first heated substrate will separate from the first heated substrate and fall by gravity, the chip on the second heated substrate will thereafter separate from the second heated substrate and also fall by gravity and so forth, said static shear force shearing off each of said chips from said respective substrate at a temperature below the melting point of said solder sufficient to cause said chips to fall, leaving on each of said interconnection pads of said chips an equivalent amount of solder such that said chip is ready for subsequent attachment into an electronic device without further removal or addition of solder;

said method further comprising applying static shear force to each of said heated substrates and respective chips.

4. The method of claim 3, further comprising heating each of said chips following said shearing thereof to bring said solder left on said interconnection pads to a liquid state sufficient to reform said solder for subsequent attachment into an electronic device.

* * * * *